United States Patent
Oike et al.

(10) Patent No.: US 12,020,479 B2
(45) Date of Patent: Jun. 25, 2024

(54) IDENTIFICATION METHOD, IDENTIFICATION SYSTEM, AND NON-TRANSITORY COMPUTER-READABLE STORAGE MEDIUM STORING A PROGRAM

(71) Applicant: SEIKO EPSON CORPORATION, Tokyo (JP)

(72) Inventors: Takumi Oike, Matsumoto (JP); Akira Ikeda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 357 days.

(21) Appl. No.: 17/509,883

(22) Filed: Oct. 25, 2021

(65) Prior Publication Data

US 2022/0129672 A1  Apr. 28, 2022

(30) Foreign Application Priority Data

Oct. 26, 2020  (JP) ................... 2020-178717

(51) Int. Cl.
*G06T 7/10* (2017.01)
*G06V 10/22* (2022.01)
*G06V 20/00* (2022.01)

(52) U.S. Cl.
CPC ............. *G06V 20/00* (2022.01); *G06T 7/10* (2017.01); *G06V 10/22* (2022.01)

(58) Field of Classification Search
None
See application file for complete search history.

(56) References Cited

U.S. PATENT DOCUMENTS

| 10,452,960 B1 | 10/2019 | Li et al. | |
|---|---|---|---|
| 2006/0071674 A1* | 4/2006 | Jean | H05B 47/155 324/686 |
| 2008/0122805 A1* | 5/2008 | Smith | A63F 13/2145 345/175 |

(Continued)

FOREIGN PATENT DOCUMENTS

| JP | 2007-11276 A | 1/2007 |
|---|---|---|
| JP | 2007-58811 A | 3/2007 |

(Continued)

OTHER PUBLICATIONS

"Pedestrian Recognition Integrating High-definition LIDAR with Vision", SSII2012 Proceedings of the 18th Image Sensing Symposium, JP, Image Sensing Technology Research Association, pp. 1-6, Jun. 6, 2012.

*Primary Examiner* — Idowu O Osifade
(74) *Attorney, Agent, or Firm* — Oliff PLC

(57) ABSTRACT

There is provided an identification method acquiring a first image, a pixel value of each of pixels of which represents a distance from a first position to an imaging target object including an identification target object, acquiring a second image captured from the first position or a second position different the first position, a pixel value of each of pixels of the second image representing at least luminance of reflected light from the imaging target object, identifying a type of the identification target object based on the second image, and calculating, based on the first image, an indicator value indicating a reliability degree of an identification result of the type of the identification target object based on the second image.

9 Claims, 10 Drawing Sheets

(56) References Cited

U.S. PATENT DOCUMENTS

| | | | |
|---|---|---|---|
| 2008/0132332 A1* | 6/2008 | Pryor | A63F 13/213 |
| | | | 463/31 |
| 2009/0015553 A1 | 1/2009 | Hirahara et al. | |
| 2011/0066343 A1 | 3/2011 | Ota et al. | |
| 2015/0145963 A1 | 5/2015 | Oshima et al. | |
| 2016/0019429 A1 | 1/2016 | Ishigaki et al. | |
| 2020/0241695 A1 | 7/2020 | Ikeda et al. | |
| 2020/0241697 A1 | 7/2020 | Ikeda et al. | |

FOREIGN PATENT DOCUMENTS

| | | |
|---|---|---|
| JP | 2010-191745 A | 9/2010 |
| JP | 2011-063131 A | 3/2011 |
| JP | 2014-9975 A | 1/2014 |
| JP | 2015-132523 A | 7/2015 |
| JP | 2015-143966 A | 8/2015 |
| JP | 2017-37614 A | 2/2017 |
| JP | 2018-147286 A | 9/2018 |
| JP | 2019-120885 A | 7/2019 |
| JP | 6549764 B1 | 7/2019 |
| JP | 2020-123115 A | 8/2020 |
| JP | 2020-123118 A | 8/2020 |
| WO | 2017/026419 A1 | 2/2017 |
| WO | 2018/163786 A2 | 9/2018 |

* cited by examiner

R1(S²=1.5)  R2(S²=6.0)  R3(S²=1.0)

IDENTIFICATION METHOD, IDENTIFICATION SYSTEM, AND NON-TRANSITORY COMPUTER-READABLE STORAGE MEDIUM STORING A PROGRAM

The present application is based on, and claims priority from JP Application Serial Number 2020-178717, filed Oct. 26, 2020, the disclosure of which is hereby incorporated by reference herein in its entirety.

BACKGROUND

1. Technical Field

The present disclosure relates to an identification method, an image display method, an identification system, an image display system, and a program.

2. Related Art

Examples of an identification technique for identifying a type of an object imaged in a captured image captured by a camera include a technique disclosed in JP-A-2010-191745 (Patent Literature 1). In the technique disclosed in Patent Literature 1, the type of the object imaged in the captured image is identified by template matching of the object imaged in the captured image and a template image of the object saved in a database.

In the technique disclosed in Patent Literature 1, when another object is imaged over a part of an identification target object, a wrong identification result is sometimes obtained.

SUMMARY

An identification method according to an aspect of the present disclosure includes: acquiring a first image, a pixel value of each of pixels of which represents a distance of an imaging target object including an identification target object from a first position; acquiring a second image captured from the first position or a second position different the first position, a pixel value of each of pixels of the second image representing at least luminance of reflected light from the imaging target object; identifying a type of the identification target object based on the second image; and calculating, based on the first image, an indicator value indicating a reliability degree of an identification result based on the second image.

An image display method according to an aspect of the present disclosure includes: acquiring a first image, a pixel value of each of pixels of which represents a distance of an imaging target object including an identification target object from a first position; acquiring a second image captured from the first position or a second position different the first position, a pixel value of each of pixels of the second image representing at least luminance of reflected light from the imaging target object; identifying a type of the identification target object based on the second image; calculating, based on the first image, an indicator value indicating a reliability degree of an identification result of the type of the identification target object based on the second image; and displaying a third image corresponding to the identification result of the type of the identification target object over the identification target object.

An identification system according to an aspect of the present disclosure includes: a first imaging device set in a first position and configured to capture a first image, a pixel value of each of pixels of which represents a distance of an imaging target object including an identification target object from the first position; a second imaging device set in the first position or a second position different from the first position and configured to capture a second image, a pixel value of each of pixels of which represents at least luminance of reflected light from the imaging target object; and a processing device. The processing device executes: acquiring the first image from the first imaging device; acquiring the second image from the second imaging device; identifying a type of the identification target object based on the second image; and calculating, based on the first image, an indicator value indicating a reliability degree of an identification result of the type of the identification target object based on the second image.

An image display system according to an aspect of the present disclosure includes: a first imaging device set in a first position and configured to capture a first image, a pixel value of each of pixels of which represents a distance of an imaging target object including an identification target object from the first position; a second imaging device set in the first position or a second position different from the first position and configured to capture a second image, a pixel value of each of pixels of which represents at least luminance of reflected light from the imaging target object; a display device; and a processing device. The processing device executes: acquiring the first image from the first imaging device; acquiring the second image from the second imaging device; identifying a type of the identification target object based on the second image; calculating, based on the first image, an indicator value indicating a reliability degree of an identification result of the type of the identification target object based on the second image; and causing the display device to display a third image corresponding to the identification result of the type of the identification target object over the identification target object.

A non-transitory computer-readable storage medium according to an aspect of the present disclosure stores a program, the program causing a computer to execute: acquiring a first image, a pixel value of each of pixels of which represents a distance of an imaging target object including an identification target object from a first position; acquiring a second image captured from the first position or a second position different the first position, a pixel value of each of pixels of the second image representing at least luminance of reflected light from the imaging target object; identifying a type of the identification target object based on the second image; and calculating, based on the first image, an indicator value indicating a reliability degree of an identification result of the type of the identification target object based on the second image.

A non-transitory computer-readable storage medium according to an aspect of the present disclosure stores a program, the program causing a computer to execute: acquiring a first image, a pixel value of each of pixels of which represents a distance of an imaging target object including an identification target object from a first position; acquiring a second image captured from the first position or a second position different the first position, a pixel value of each of pixels of the second image representing at least luminance of reflected light from the imaging target object; identifying a type of the identification target object based on the second image; calculating, based on the first image, an indicator value indicating a reliability degree of an identification result of the type of the identification target object based on the second image; and displaying a third image corresponding to the identification result of the type of the identification target object over the identification target object.

DESCRIPTION OF EXEMPLARY EMBODIMENTS

Embodiments of the present disclosure are explained below with reference to the drawings. Technically preferred various limitations are added to the embodiments explained below. However, embodiments of the present disclosure are not limited to the embodiments explained below.

1. First Embodiment

Figure 1:
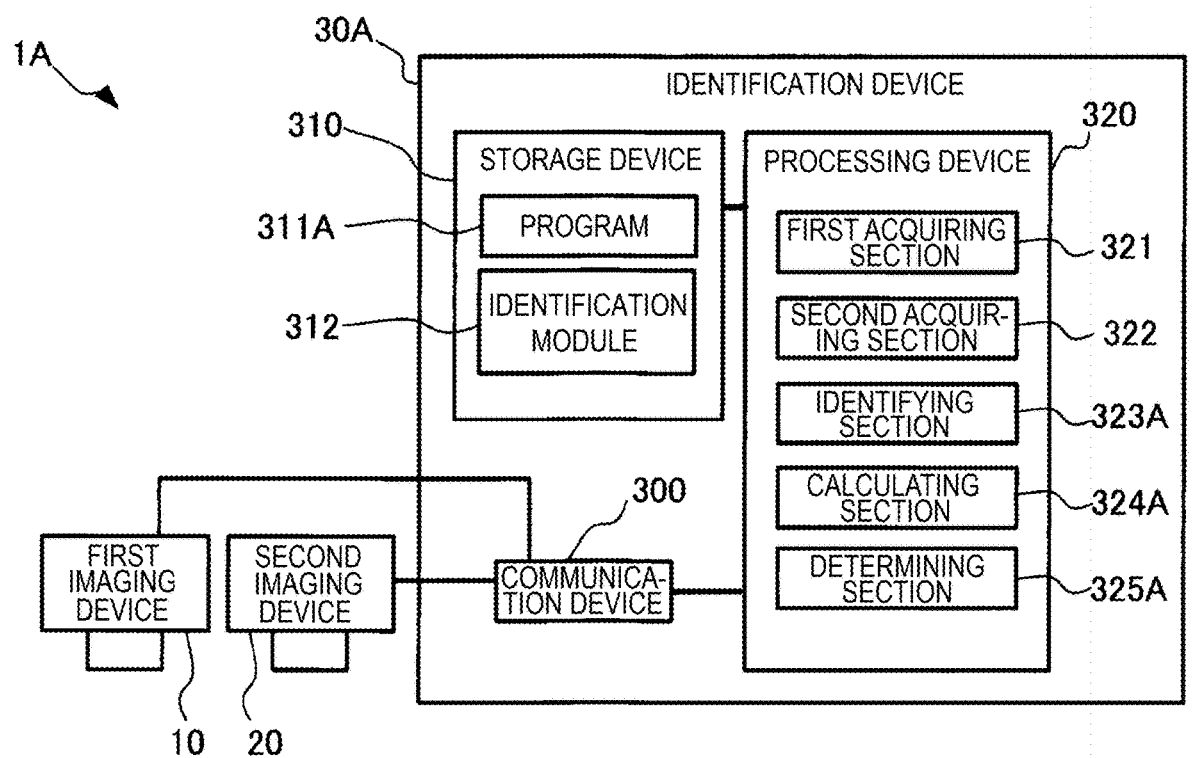
FIG. 1 is a block diagram showing a configuration example of an identification system including an identification device that executes an identification method according to a first embodiment of the present disclosure.

FIG. 1 is a block diagram showing a configuration example of an identification system 1A including an identification device 30A that executes an identification method according to a first embodiment of the present disclosure. As shown in FIG. 1, the identification system 1A includes a first imaging device 10 and a second imaging device 20 besides the identification device 30A. As shown in FIG. 1, the first imaging device 10 and the second imaging device 20 are coupled to the identification device 30A.

Figure 2:
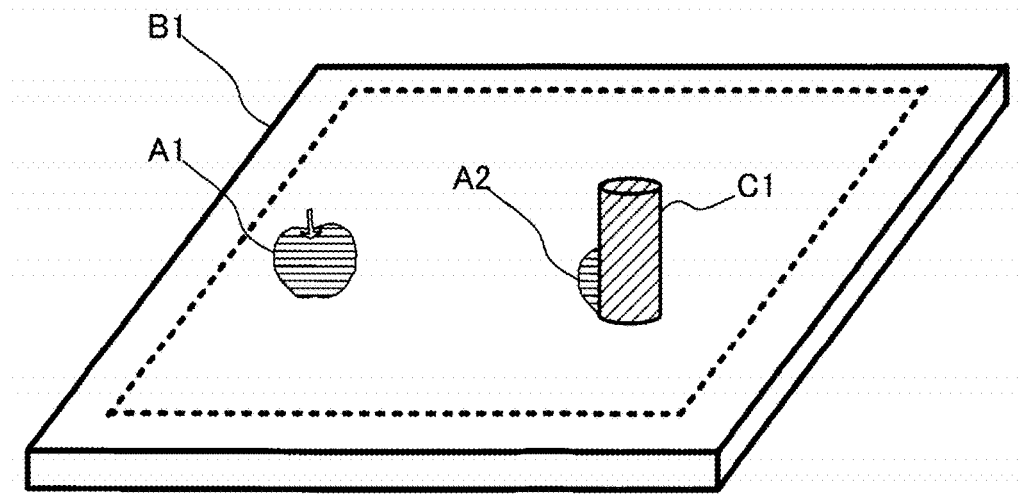
FIG. 2 is a diagram showing an example of an imaging target object in the embodiment.

As explained in detail below, the identification device 30A identifies a type of an object to be an identification target based on a captured image of an imaging target object in which the object to be the identification target is disposed on an object to be a background. In the following explanation, the object to be the background is referred to as background object. The object to be the identification target is referred to as identification target object. The imaging target object in which the identification target object is disposed on the background object is an example of the imaging target object including the identification target object in the present disclosure. FIG. 2 is a diagram showing an example of the imaging target object in this embodiment. In the imaging target object in this embodiment, identification target objects A1, A2, and C1 are disposed on a background object B1. The background object B1 is a desk. The identification target object A1 and the identification target object A2 are apples. The identification target object C1 is a cylindrical vase.

The first imaging device 10 is a distance camera such as a ToF camera, a structured optical camera, or a stereo camera. The distance camera is a camera that captures a distance image. The distance image is an image, a pixel value of each of pixels of which represents the distance from an imaging target object to a setting position of the distance camera. Every time the first imaging device 10 images the imaging target object, the first imaging device 10 outputs image data representing the captured distance image to the identification device 30A. In the following explanation, the image data representing the distance image is referred to as distance image data.

Figure 3:
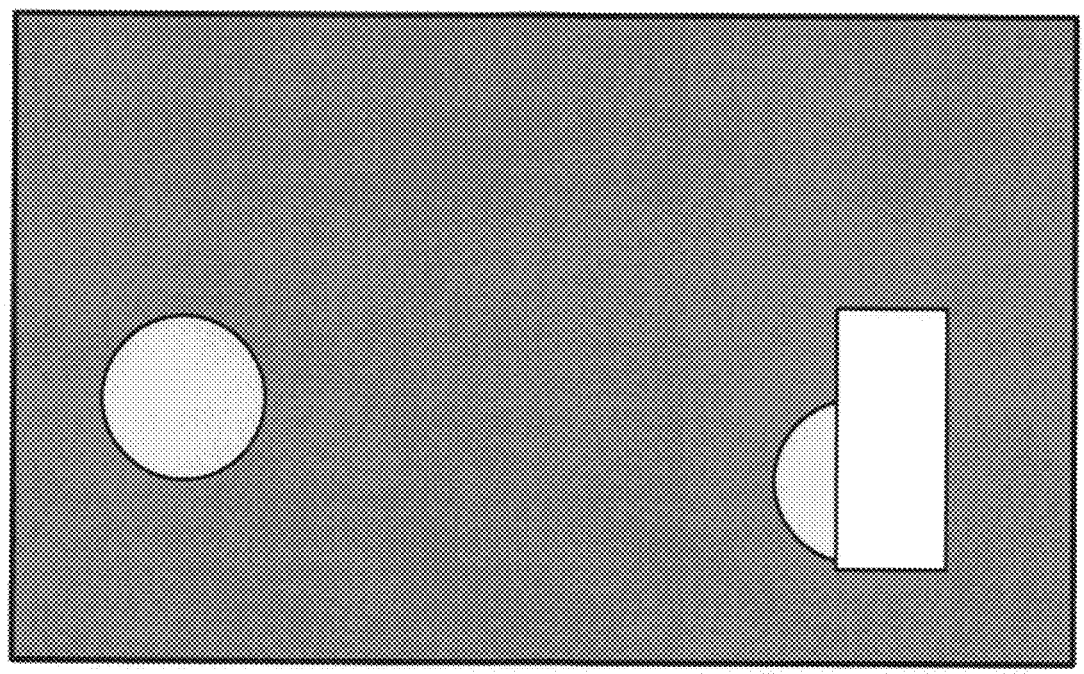
FIG. 3 is a diagram showing an example of a distance image.

The first imaging device 10 is fixed in an obliquely upward position of the imaging target object shown in FIG. 2. The first imaging device 10 images a range surrounded by a broken line in FIG. 2 in every frame period having a predetermined time length. FIG. 3 is a diagram showing an example of a distance image obtained by imaging the imaging target object shown in FIG. 2 with the first imaging device 10. As shown in FIG. 3, the distance image in this embodiment is a gray scale image. In the distance image in this embodiment, when a distance from the imaging target object about a first pixel is longer than a distance from the imaging target object about a second pixel, a pixel value of the first pixel is smaller than a pixel value of the second pixel. That is, the first pixel is blacker than the second pixel. A setting position of the first imaging device 10 is an example of the first position in the present disclosure. The distance image obtained by imaging the imaging target object shown in FIG. 2 with the first imaging device 10 is an example of the first image in the present disclosure.

The second imaging device 20 is an RGB camera. A pixel value of each of pixels in an image captured by the second imaging device 20 represents luminance of reflected light from the imaging target object. In the following explanation, the image, the pixel value of each of the pixels of which represents the luminance of the reflected light from the imaging target object, is referred to as luminance image. In this embodiment, the second imaging device 20 is the RGB camera. However, the second imaging device 20 may be a gray camera or an infrared camera. The second imaging device 20 is fixed to a position near the first imaging device 10. A setting position of the second imaging device 20 is an example of the second position different from the first position in the present disclosure. The luminance image captured by the second imaging device 20 is an example of the second image in the present disclosure.

Figure 4:
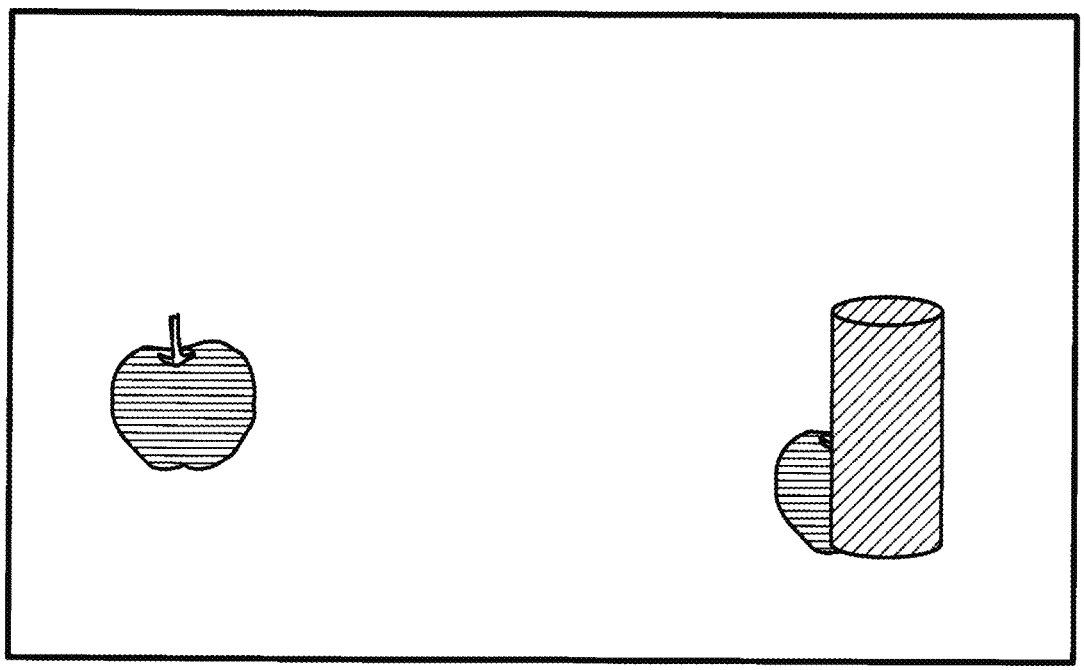
FIG. 4 is a diagram showing an example of a luminance image.

Like the first imaging device 10, the second imaging device 20 images, in every frame period, the range surrounded by the broken line in FIG. 2 from obliquely above the imaging target object shown in FIG. 2. In this embodiment, imaging timing by the second imaging device 20 and imaging timing by the first imaging device 10 are the same. The second imaging device 20 outputs, to the identification device 30A, image data representing a luminance image captured every time the second imaging device 20 images the imaging target object. In the following explanation, the image data representing the luminance image is referred to as luminance image data. FIG. 4 is a diagram showing an example of the luminance image obtained by imaging the imaging target object shown in FIG. 2 with the second imaging device 20. In FIG. 4, a difference of each of the background object B1 and the identification target objects A1, A2, and C1 is indicated by presence or absence of hatching and a hatching pattern. In this embodiment, zooming in the second imaging device 20 and zooming in the first imaging device 10 are set to the same value. Accordingly, the distance image captured by the first imaging device 10 and the luminance image captured by the second imaging device 20 are images obtained by imaging the same imaging range from substantially the same position at substantially the same zooming.

The identification device 30A identifies types of the identification target objects A1, A2, and C1 based on the luminance image data output from the second imaging device 20. The identification device 30A calculates, based on the distance image data output from the first imaging device 10, an indicator value indicating a reliability degree of an identification result based on the luminance image data. The identification device 30A determines, based on the indicator value, whether to validate or invalidate the identification result based on the luminance image data. The identification device 30A markedly indicating characteristics of this embodiment is mainly explained below.

The identification device 30A is, for example, a personal computer. As shown in FIG. 1, the identification device 30A includes a communication device 300, a storage device 310, and a processing device 320. The first imaging device 10 and the second imaging device 20 are connected to the communication device 300. The communication device 300 is a communication interface that executes data communication with an external device. The communication device 300 includes, for example, an interface circuit that processes transmitted and received signals. Specific examples of the communication device 300 include a wireless communication module or a wired communication module. When the communication device 300 is the wired communication module, the first imaging device 10 and the second imaging device 20 are connected to the communication device 300 via a communication line. The connection between the first imaging device 10 and the second imaging device 20 and the identification device 30A may be direct connection not via a relay device such as a wireless access point device or a router or may be indirect connection via the relay device. When the communication device 300 is the wireless communication module, specific examples of the direct connection include ad-hoc connection and specific examples of the indirect connection include access point connection via a wireless access point device. When the communication device 300 is the wired communication module, specific examples of the direct connection include peer to peer connection and specific examples of the indirect connection include connection via a wired router or a wired hub. The communication device 300 receives distance image data output from the first imaging device 10. The communication device 300 receives luminance image data output from the second imaging device 20.

The storage device 310 is a recording medium readable by the processing device 320. The storage device 310 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM (Random Access Memory).

A program 311A to be executed by the processing device 320 and an identification module 312 are stored in the nonvolatile memory of the storage device 310. The volatile memory of the storage device 310 is used by the processing device 320 as a work area in executing the program 311A. The program 311A can also be called "application program", "application software", or "application". The program 311A is acquired from, for example, a not-shown server via the communication device 300 and, thereafter, stored in the storage device 310. The program 311A may be stored in the storage device 310 in advance.

The identification module 312 is a convolutional neural network generated by machine learning such as deep learning using learning data that associates luminance images of objects and labels indicating types of the objects. The identification module 312 has learned about apples, vases, and desks. The identification module 312 outputs a label indicating a type of an object imaged in an input luminance image. The identification module 312 is an example of a discriminator in the present disclosure.

The processing device 320 includes a processor such as a CPU (Central Processing Unit), that is, a computer. The processing device 320 may be configured by a single computer or may be configured by a plurality of computers. According to operation for instructing an execution start of the program 311A performed on a not-shown input device, the processing device 320 reads out the program 311A from the nonvolatile memory to the volatile memory and starts execution of the program 311A. The processing device 320 operating according to the program 311A functions as a first acquiring section 321, a second acquiring section 322, an identifying section 323A, a calculating section 324A, and a determining section 325A shown in FIG. 1. The first acquiring section 321, the second acquiring section 322, the identifying section 323A, the calculating section 324A, and the determining section 325A shown in FIG. 1 are software modules realized by causing the processing device 320 to operate according to the program 311A.

The first acquiring section 321 acquires distance image data received by the communication device 300. The second acquiring section 322 acquires luminance image data received by the communication device 300.

Figure 5:
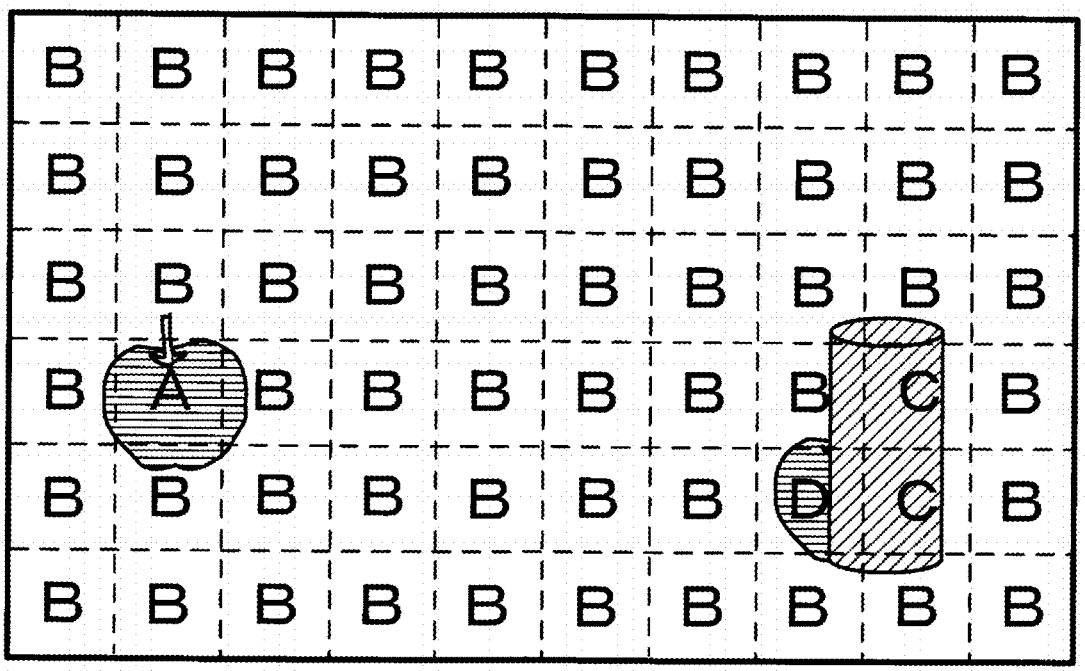
FIG. 5 is a diagram showing an example of an identification result based on the luminance image.

The identifying section 323A identifies, using a luminance image represented by the luminance image data acquired by the second acquiring section 322 and the identification module 312, a type of an object imaged in the luminance image. The identifying section 323A may apply rectangular conversion to the luminance image data such that the luminance image represented by the luminance image data acquired by the second acquiring section 322 becomes a rectangle having a predetermined size. As shown in FIG. 5, the identifying section 323A divides the luminance image represented by the luminance image data into N×M sub-luminance images in total in N rows and M columns using a grid. In an example shown in FIG. 5, N=6. N only has to be an integer equal to or larger than 2. In the example shown in FIG. 5, M=10. M only has to be an integer equal to or larger than 2. Any one sub-luminance image among the N×M sub-luminance images is an example of a third sub-image in the present disclosure. A sub-luminance image different from the one sub-luminance image is an example of a fourth sub-image in the present disclosure.

In the following explanation, the N rows of the sub-luminance images are numbered as first row, second row, . . . , and N-th row from the top to the bottom. The M columns of the sub-luminance images are numbered as first column, second column, . . . , and M-th column from the left to the right. Therefore, the sub-luminance image at the upper left corner among 6×10 pixels shown in FIG. 5 is the sub-luminance image in the first row, first column and the sub-luminance image at the lower right corner is the sub-luminance image in the sixth row, tenth column.

The identifying section 323A sets each of the N×M sub-luminance images as an identification target image and inputs image data representing the identification target image to the identification module 312. The identifying section 323A acquires a label indicating a type of an object imaged in the identification target image from the identification module 312 to identify the type of the object. In FIG. 5, a label acquired from the identification module 312 about each of the N×M sub-luminance images is indicated by one alphabet character. In FIGS. 5, A, B, and C are respectively labels indicating an apple, a background object, and a vase. D in FIG. 5 is a label indicating an object that is not the apple, the background object, and the vase. The label D is output for a sub-luminance image in the fifth row, eighth column because, although a part of the identification target object A2 is imaged in the sub-luminance image, since the identification target object C1 and the background object B1 are also imaged, identification using the identification module 312 is ended in failure.

The calculating section 324A calculates, based on a distance image represented by the distance image data acquired by the first acquiring section 321, an indicator value indicating a reliability degree of an identification result by the identifying section 323A. More specifically, the calculating section 324A divides the distance image represented by the distance image data into N×M sub-distance images using a grid. As explained above, the distance image captured by the first imaging device 10 and the luminance image captured by the second imaging device 20 are the images obtained by capturing the same imaging range from substantially the same position at the same zooming. Therefore, each of the N×M sub-distance images corresponds to each of the N×M sub-luminance images in a one-to-one relation. For example, a sub-distance image in the first row, first column and a sub-luminance image in the first row, first column are images obtained by imaging substantially the same imaging range. In order to more accurately associate the sub-luminance images and the sub-distance images, the identifying section 323A may apply the rectangular conversion to the luminance image such that a contour of the luminance image becomes a rectangle having a predetermined size and, thereafter, divide the luminance image into the sub-luminance images. The calculating section 324A may apply the rectangular conversion to the distance image and, thereafter, divide the distance image into the sub-distance images. Any one sub-distance image among the N×M sub-distance images obtained by dividing the distance image is an example of a first sub-image in the present disclosure. A sub-distance image different from the one sub-distance image is an example of a second sub-image in the present disclosure.

Subsequently, the calculating section 324A sets each of the N×M sub-distance images as a calculation target image and calculates indicator values based on statistical amounts of pixel values of pixels forming the calculation target image. In this embodiment, the calculating section 324A calculates dispersion $S^2$ indicated by the following Expression (1) as a statistical amount of a pixel value of each of the pixels forming the calculation target image. In Expression (1), L is a total number of pixels forming the calculation target image, L is an integer equal to or larger than 2, and $x_i$ is a pixel value of an i-th pixel in the L pixels forming the calculation target image. That is, i is any one of integers 1 to L. In Expression (1), $x_{ave}$ is an addition average value of the pixel values of the L pixels forming the calculation target image.

$$S^2 = \frac{1}{L}\sum_{i=1}^{L}(x_i - x_{ave})^2 \tag{1}$$

Figure 6:
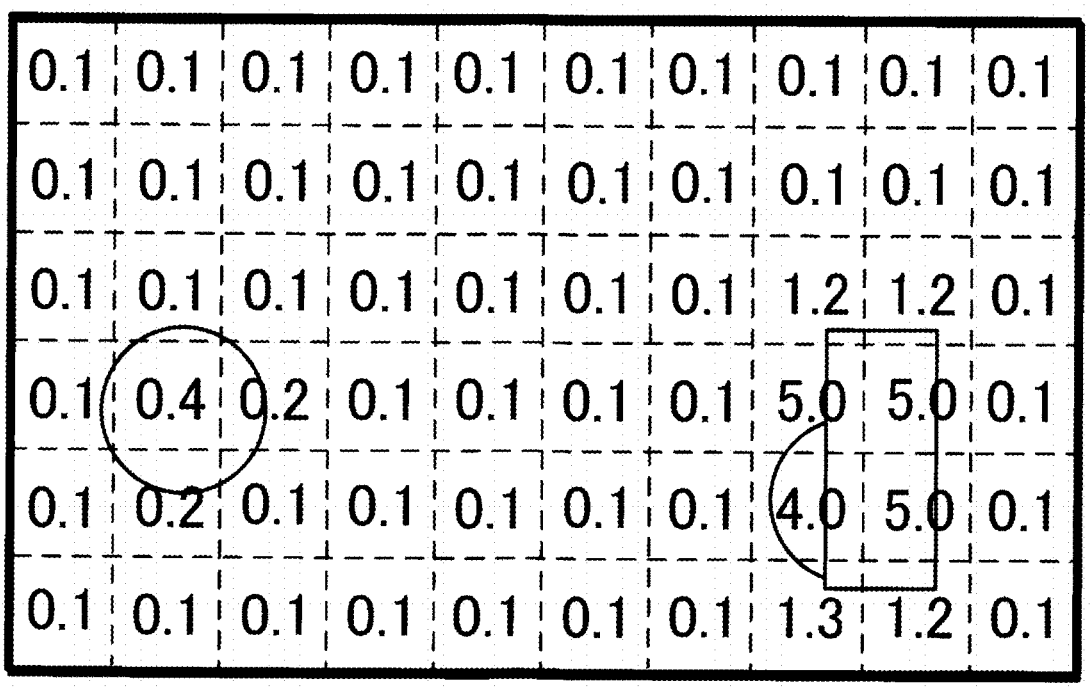
FIG. 6 is a diagram showing an example of statistical amounts calculated based on the distance image.

FIG. 6 is a diagram showing an example of statistical values calculated about each of the N×M sub-distance images. In FIG. 6, values of the dispersion $S^2$ calculated about each of the N×M sub-distance images are shown in the sub-distance images. In FIG. 6, drawing of gradations representing distances is omitted. The values of the dispersion $S^2$ about sub-distance images in the fourth row, eighth column, the fourth row, ninth column, the fifth row, eighth column, and the fifth row, ninth column are extremely large. This is because a plurality of objects are imaged in the sub-distance images and fluctuation in distances is large in the sub-distance images.

The calculating section 324A calculates an indicator value that is smaller as the statistical amount is larger. In this embodiment, the calculating section 324A calculates the inverse of the statistical amount as the indicator value. However, the indicator value may be a value obtained by subtracting the statistical value from a predetermined value. A reason why the indicator value indicates the reliability degree of the identification result by the identifying section 323A is as follows. As explained above, the statistical amount calculated about the sub-distance image being large means that fluctuation in a pixel value of each of pixels forming the sub-distance image is large. When the statistical amount calculated about the sub-distance image is large, it is highly likely that a plurality of objects are imaged in the sub-distance image and it is highly likely that a plurality of objects are also imaged in a sub-luminance image corresponding to the sub-distance image. Even if identification of an object by the identifying section 323A is performed on the sub-luminance image in which the plurality of objects are imaged, it is highly likely that a result of the identification is wrong. Therefore, the indicator value calculated based on the statistical amounts of the pixel values of the pixels forming the sub-distance image indicates a reliability degree of an identification result by the identifying section 323A for a sub-luminance image corresponding to the sub-distance image.

Figure 7:
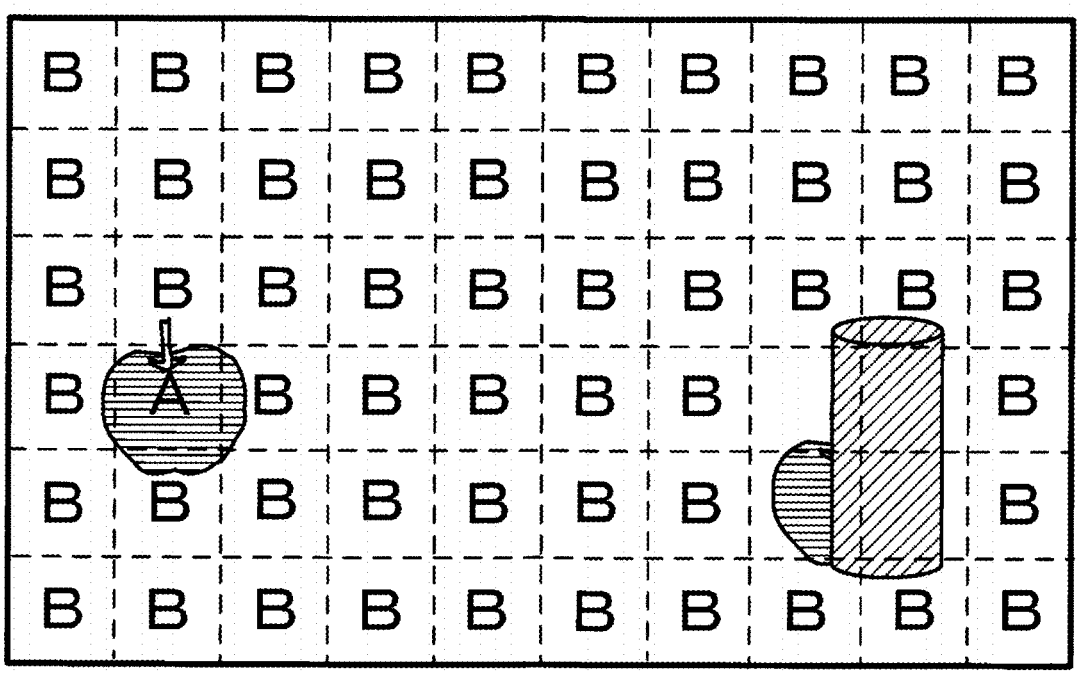
FIG. 7 is a diagram showing an example of an identification result by the identification device.

The determining section 325A determines, based on the reliability degree calculated by the calculating section 324A, for each of the sub-luminance images, whether the identification result by the identifying section 323A is invalid. More specifically, the determining section 325A sets each of the N×M sub-luminance images as a determination target image and determines whether an indicator value calculated by the calculating section 324A about the sub-distance image corresponding to the determination target image is smaller than a threshold. When the indicator value calculated by the calculating section 324A is smaller than the threshold, the determining section 325A invalidates an identification result of the identifying section 323A based on the determination target image. A value of the threshold is, for example, 0.5 but may be another value. A suitable value only has to be set for the threshold by performing an experiment as appropriate. In this embodiment, since the inverse of the dispersion $S^2$ calculated about the sub-distance image is the indicator value, the indicator value is smaller than 0.5 about a sub-distance image having the dispersion $S^2$ equal to or larger than 2.0. An identification result based on a sub-luminance image corresponding to the sub-distance image is invalidated. Specifically, an identification result based on sub-luminance images corresponding to the sub-distance images in the fourth row, eighth column, the fourth row, ninth column, the fifth row, eighth column, and the fifth row, ninth column in FIG. 6 is invalidated. As a result, an identification result shown in FIG. 7 is obtained. FIG. 7 is different from FIG. 5 in that labels in which the identification result is invalidated are deleted.

Figure 8:
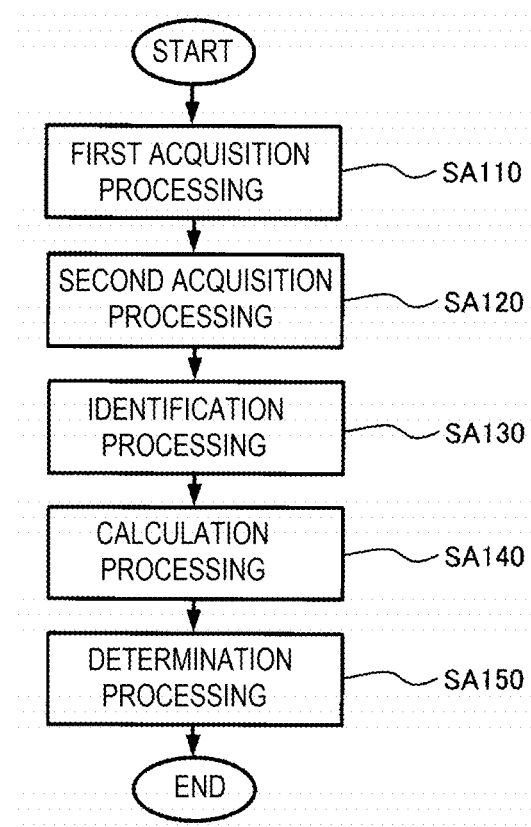
FIG. 8 is a flowchart showing a flow of the identification method in the embodiment.

The processing device 320 operating according to the program 311A executes an identification method in the first embodiment of the present disclosure. FIG. 8 is a flowchart showing a flow of the identification method. As shown in FIG. 8, the identification method includes first acquisition processing SA110, second acquisition processing SA120, identification processing SA130, calculation processing SA140, and determination processing SA150.

In the first acquisition processing SA110, the processing device 320 functions as the first acquiring section 321. In the first acquisition processing SA110, the processing device 320 acquires distance image data received by the communication device 300. In the second acquisition processing SA120 following the first acquisition processing SA110, the processing device 320 functions as the second acquiring section 322. In the second acquisition processing SA120, the processing device 320 acquires luminance image data received by the communication device 300.

In the identification processing SA130 following the second acquisition processing SA120, the processing device 320 functions as the identifying section 323A. In the identification processing SA130, the processing device 320 divides a luminance image represented by the luminance image data acquired by the second acquiring section 322 into N×M sub-luminance images. Subsequently, the processing device 320 inputs each of the N×M sub-luminance images to the identification module 312 as an identification target image and acquires a label indicating a type of an object imaged in the identification target image.

In the calculation processing SA140 following the identification processing SA130, the processing device 320 functions as the calculating section 324A. In the calculation processing SA140, the processing device 320 divides a distance image represented by the distance image data acquired by the first acquiring section 321 into N×M sub-distance images. Subsequently, the processing device 320 sets each of the N×M sub-distance images as a calculation target image and calculates indicator values corresponding to statistical amounts of pixel values in the calculation target image.

In the determination processing SA150 following the calculation processing SA140, the processing device 320 functions as the determining section 325A. In the determination processing SA150, the processing device 320 sets each of the N×M sub-luminance images as a determination target image and determines whether the indicator value calculated in the calculation processing SA140 about the sub-distance image corresponding to the determination target image is smaller than a threshold. When the indicator value calculated in the calculation processing SA140 is smaller than the threshold, the processing device 320 invalidates an identification result of the identifying section 323A based on the determination target image.

According to this embodiment, a reliability degree of an identification result of an identification target object based on a luminance image can be grasped from a distance image different from the luminance image. In addition, in this embodiment, when an indicator value indicating a reliability degree of the identification result based on the luminance image is smaller than a threshold, the identification result is invalidated. In this embodiment, validity of the identification result based on the luminance image is determined using indicator values corresponding to statistical amounts of pixel values in the distance image. Therefore, it is possible to invalidate an identification error due to existence of a plurality of objects in the image.

2. Second Embodiment

Figure 9:
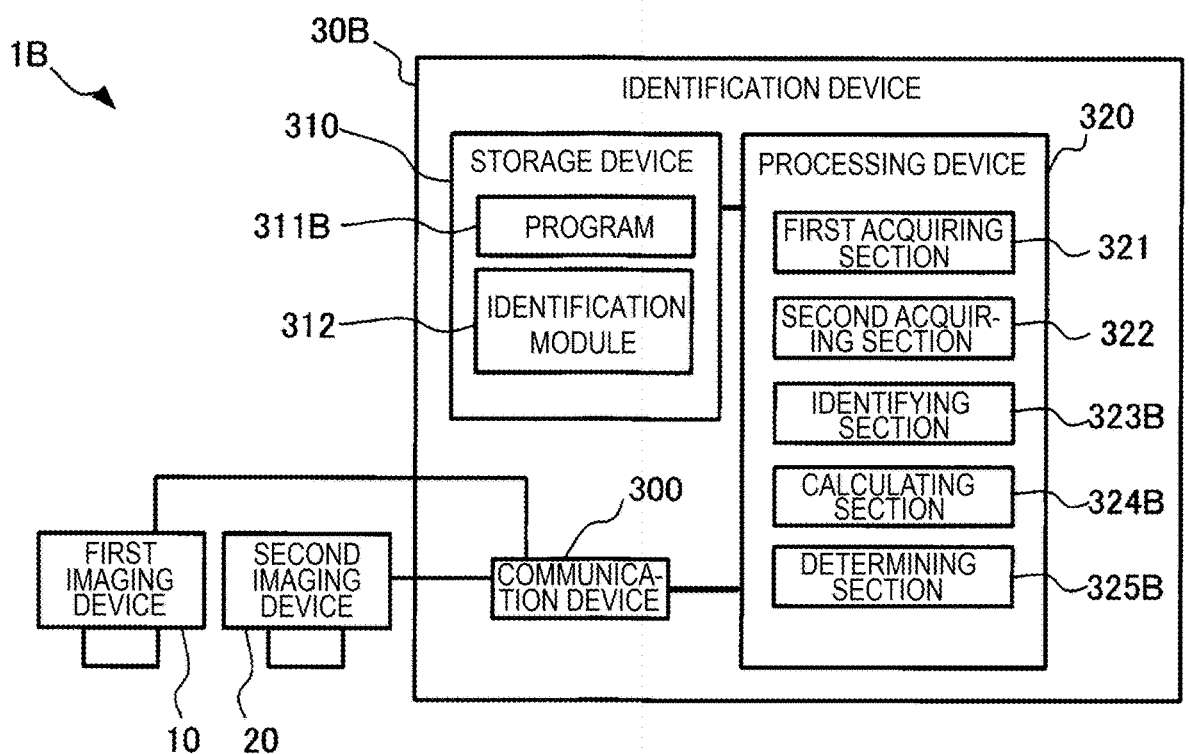
FIG. 9 is a block diagram showing a configuration example of an identification system including an identification device that executes an identification method according to a second embodiment of the present disclosure.

FIG. 9 is a block diagram showing a configuration example of an identification system 1B according to a second embodiment of the present disclosure. In FIG. 9, the same components as the components shown in FIG. 1 are denoted by the same reference numerals and signs. As it is evident if FIG. 9 and FIG. 1 are compared, the identification system 1B is different from the identification system 1A in that the identification system 1B includes an identification device 30B instead of the identification device 30A. Like the identification device 30A, the identification device 30B is a personal computer. As it is evident if FIG. 9 and FIG. 1 are compared, a hardware configuration of the identification device 30B is the same as the hardware configuration of the identification device 30A. The identification device 30B is different from the identification device 30A in that a program 311B is stored in the storage device 310 instead of the program 311A.

The processing device 320 of the identification device 30B executes the program 311B to thereby function as the first acquiring section 321, the second acquiring section 322, an identifying section 323B, a calculating section 324B, and a determining section 325B shown in FIG. 9. The first acquiring section 321, the second acquiring section 322, the identifying section 323B, the calculating section 324B, and the determining section 325B are software modules realized by causing the processing device 320 to operate according to the program 311B. The identifying section 323B, the calculating section 324B, and the determining section 325B, which are differences from the first embodiment, are mainly explained below.

Figure 10:
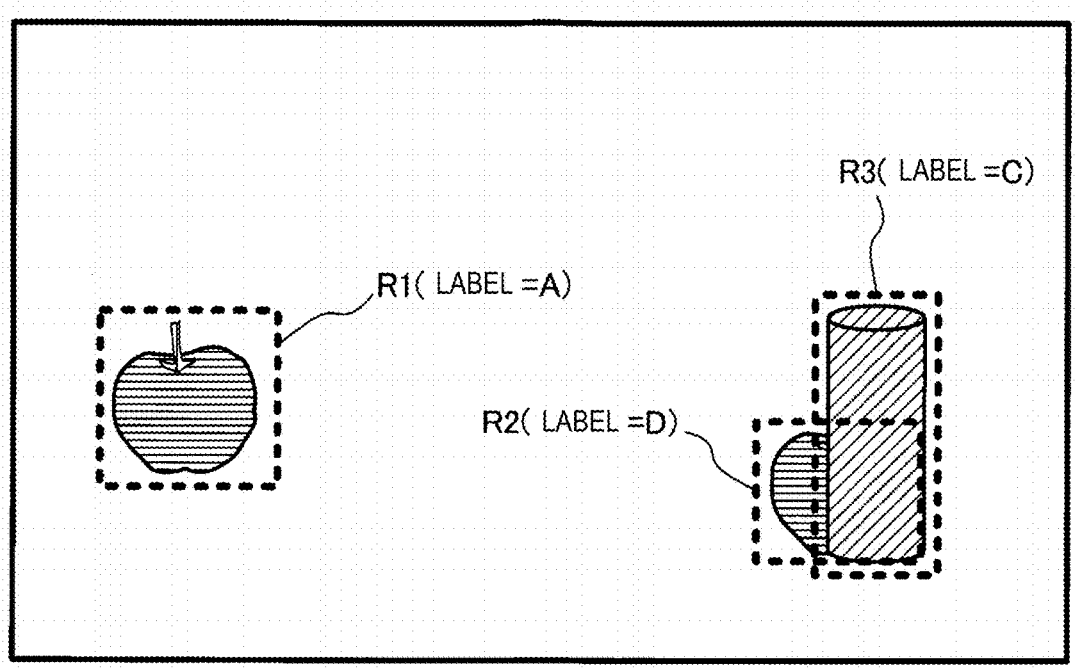
FIG. 10 is a diagram showing an example of an identification result based on a luminance image.

Like the identifying section 323A, the identifying section 323B identifies, using a luminance image represented by luminance image data acquired by the second acquiring section 322 and the identification module 312, a type of an object imaged in the luminance image. The identifying section 323B may also apply rectangular conversion to the luminance image represented by the luminance image data and, thereafter, perform identification of the type of the object. The identifying section 323B inputs the luminance image data acquired by the second acquiring section 322 to the identification module 312 and acquires a label indicating a type of an identification target object imaged in the luminance image and data indicating a region of interest. The region of interest means a region occupied by the identification target object in the luminance image. The region of interest is an example of a first region in the present disclosure. FIG. 10 is a diagram showing an example of an identification result obtained when the luminance image data representing the luminance image shown in FIG. 4 is input to the identification module 312 and a specifying result of the region of interest. As shown in FIG. 10, in this embodiment, a region of interest R1 is specified about the identification target object A1 and A is acquired as the label. A region of interest R2 is specified about the identification target object A2 and D is acquired as the label. A region of interest R3 is specified about the identification target object C1 and C is acquired as the label.

The calculating section 324B sets, as a calculation target image, a region of a distance image corresponding to the region of interest specified by the identifying section 323B and calculates, based on statistical amounts of pixel values in the calculation target image, indicator values indicating a reliability degree of an identification result by the identifying section 323B. The region of the distance image corresponding to the region of interest is an example of a second region in the present disclosure. The indicator values in this embodiment are also the inverses of the statistical amounts as in the first embodiment. In this embodiment, the dispersion $S^2$ indicated by Expression (1) described above is used as the statistical amounts of the pixel values in the calculation target image. In this embodiment, as in the first embodiment, larger indicator values mean that the reliability degree of the identification result by the identifying section 323B is higher. The calculating section 324B may also apply rectangular conversion to a distance image represented by the distance image data and, thereafter, perform the calculation of the indicator values.

Figure 11:
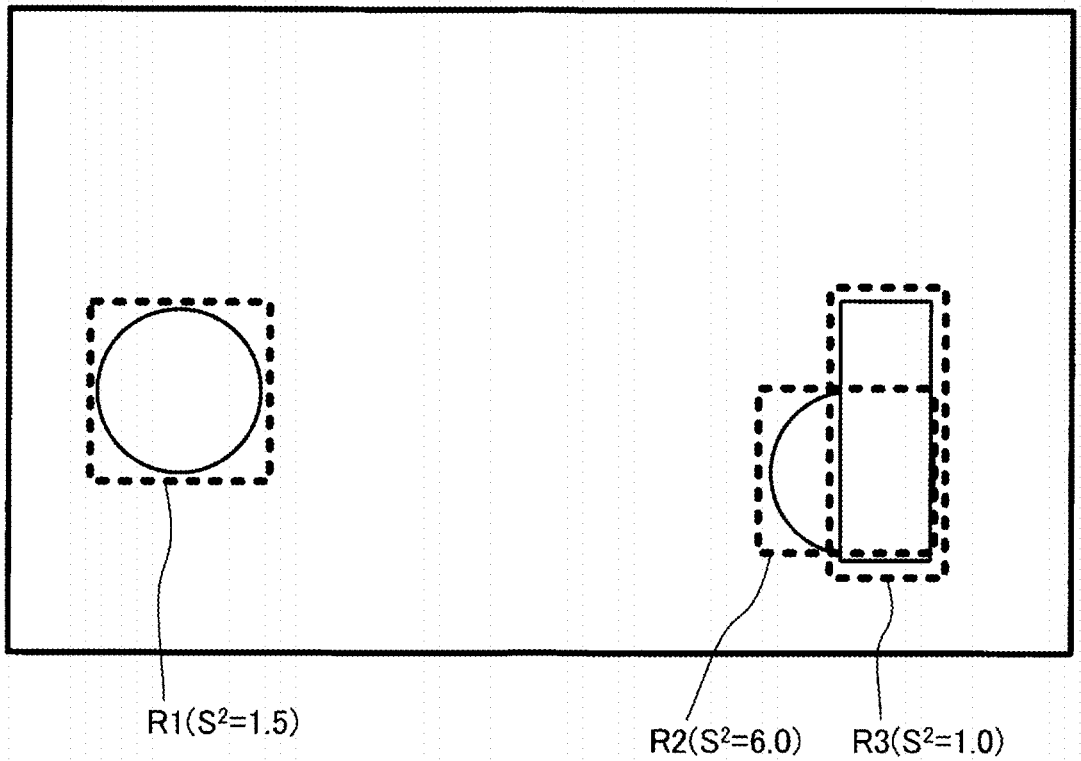
FIG. 11 is a diagram showing an example of statistical amounts calculated based on a distance image.

FIG. 11 is a diagram showing, about each of regions of interest R1, R2, and R3, a calculation result of a statistical amount based on the luminance image shown in FIG. 3. As shown in FIG. 11, 1.5 is calculated as the dispersion $S^2$ about the region of interest R1, 6.0 is calculated as the dispersion $S^2$ about the region of interest R2, and 1.0 is calculated as the dispersion $S^2$ about the region of interest R3. The dispersion $S^2$ calculated about the region of interest R2 is extremely large because images of a plurality of objects are included in the region of interest R2. As explained above, the calculating section 324B calculates the inverses of the statistical amounts of the pixel values in the calculation target image as the indicator values. Therefore, 0.67 is calculated as the indicator value about the region of interest R1, 0.16 is calculated as the indicator value about the region of interest R2, and 1.0 is calculated as the indicator value about the region of interest R3.

The determining section 325B determines, based on the reliability degree calculated by the calculating section 324B, for each of the regions of interest, whether the identification result by the identifying section 323B is invalid. More specifically, the determining section 325B determines, for each of the regions of interest, whether the indicator value calculated by the calculating section 324B is smaller than a threshold. The determining section 325B invalidates the identification result of the identifying section 323B about the region of interest in which the indicator value calculated by the calculating section 324B is smaller than the threshold. In this embodiment, as in the first embodiment, a value of the threshold is 0.5. Accordingly, in this embodiment, the identification result is invalidated only about the region of interest R2 among the regions of interest R1, R2, and R3.

Figure 12:
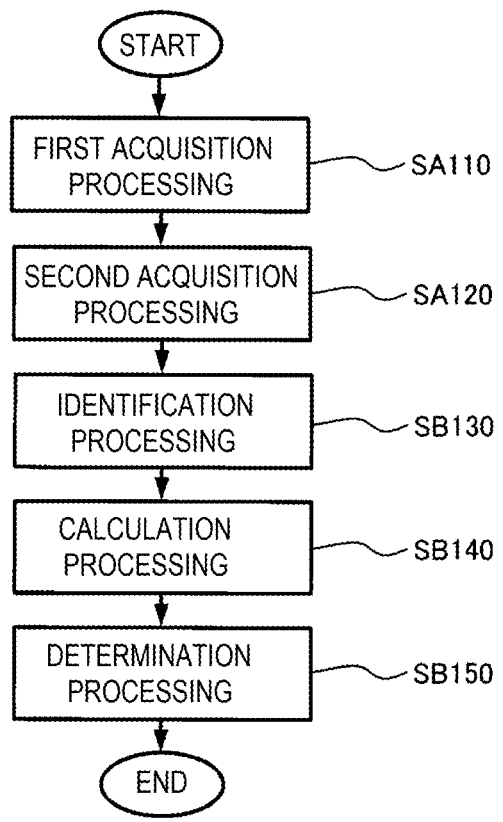
FIG. 12 is a flowchart showing a flow of the identification method in the embodiment.

The processing device 320 of the identification device 30B executes an identification method in the second embodiment of the present disclosure according to the program 311B. FIG. 12 is a flowchart showing a flow of the identification method. As shown in FIG. 12, the identification method includes the first acquisition processing SA110, the second acquisition processing SA120, identification processing SB130, calculation processing SB140, and determination processing SB150. The identification processing SB130, the calculation processing SB140, and the determination processing SB150, which are differences from the identification method in the first embodiment, are mainly explained below.

In the identification processing SB130, the processing device 320 of the identification device 30B functions as the identifying section 323B. In the identification processing SB130, the processing device 320 of the identification device 30B inputs the luminance image data acquired by the second acquiring section 322 to the identification module 312 and acquires a label of a type of an identification target object imaged in the luminance image and data indicating a region of interest.

In the calculation processing SB140 following the identification processing SB130, the processing device 320 of the identification device 30B functions as the calculating section 324B. In the calculation processing SB140, the processing device 320 of the identification device 30B sets, as a calculation target region, a region of a distance image corresponding to the region of interest specified in the identification processing SB130 and calculates, based on statistical amounts of pixel values in the calculation target image, indicator values indicating a reliability degree of an identification result in the identification processing SB130.

In the determination processing SB150 following the calculation processing SB140, the processing device 320 of the identification device 30B functions as the determining section 325B. In the determination processing SB150, the processing device 320 of the identification device 30B determines, for each of the regions of interest, whether the indicator value calculated in the calculation processing SB140 is smaller than a threshold and invalidates an identification result about the region of interest where the indicator value is smaller than the threshold.

According to this embodiment as well, a reliability degree of an identification result of an identification target object based on a luminance image can be grasped from a distance image different from the luminance image. In this embodiment as well, since validity of the identification result based on the luminance image is determined using indicator values corresponding to statistical amounts of pixel values in the distance image, an identification error due to existence of a plurality of objects in the image can be invalidated. According to this embodiment, since the indicator values are calculated only about regions of interest, a processing load required for the calculation of the indicator values can be reduced compared with the first embodiment.

3. Third Embodiment

Figure 13:
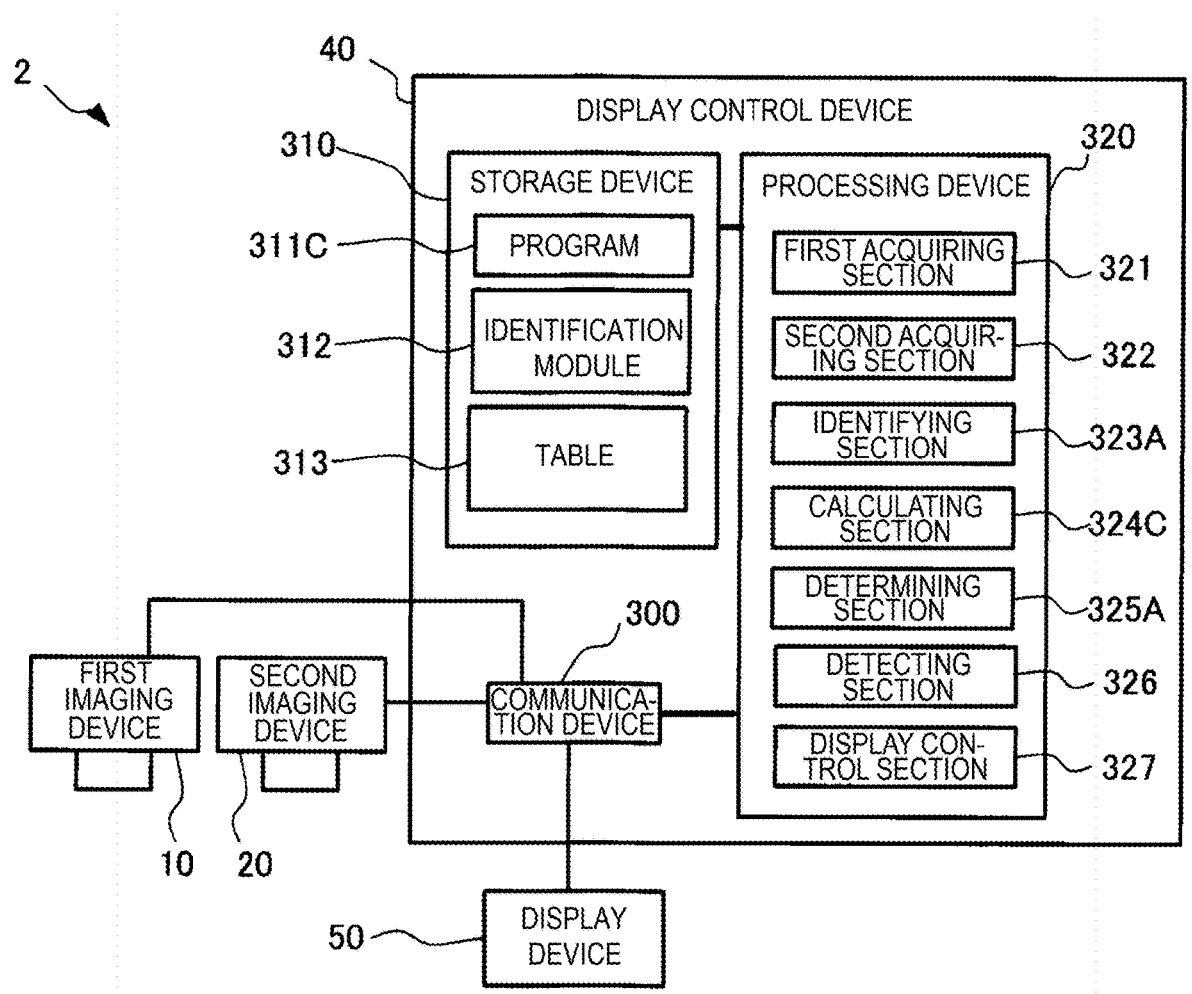
FIG. 13 is a block diagram showing a configuration example of an image display system including a display control device that executes an image display method according to a third embodiment of the present disclosure.

FIG. 13 is a block diagram showing a configuration example of an image display system 2 including a display control device 40 that executes an image display method according to a third embodiment of the present disclosure. As shown in FIG. 13, the image display system 2 includes the first imaging device 10, the second imaging device 20, and a display device 50 besides the display control device 40. As shown in FIG. 13, the first imaging device 10, the second imaging device 20, and the display device 50 are connected to the display control device 40. The display device 50 and the display control device 40, which are differences from the first embodiment, are explained below.

The display device 50 displays an image under control by the display control device 40. The display device 50 in this embodiment is a projector.

Figure 14:
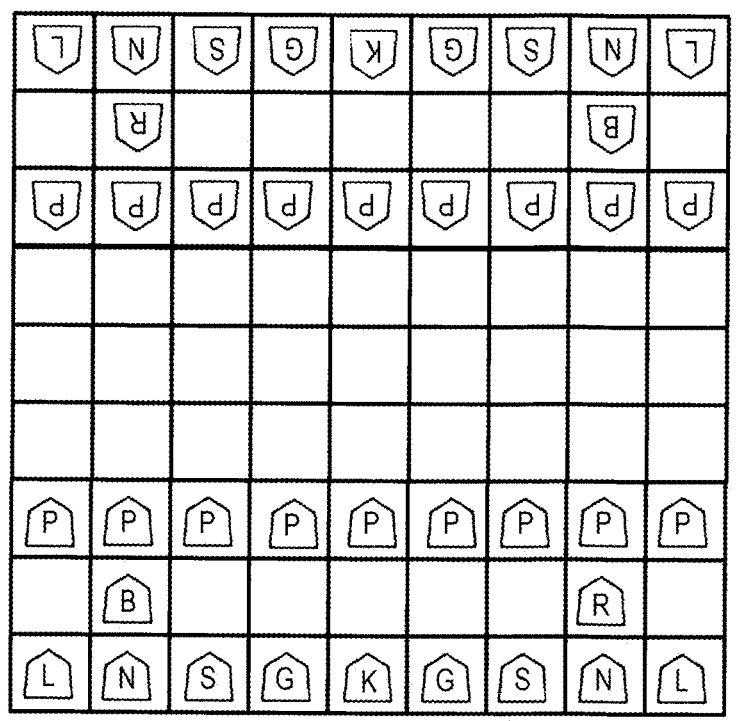
FIG. 14 is a diagram showing an example of an imaging target object in the embodiment.

Like the identification device 30A or the identification device 30B, the display control device 40 is a personal computer. The display control device 40 identifies, based on a luminance image captured by the second imaging device 20, a type of an object to be a projection destination of an image by the display device 50. The display control device 40 controls the display device 50 to project an image corresponding to an identification result based on the luminance image. That is, in this embodiment, the object to be the projection destination of the image from the display device 50 is an identification target object. FIG. 14 is a diagram showing an imaging target object in this embodiment. As shown in FIG. 14, the imaging target object in this embodiment is a shogi board on which shogi pieces are arranged. In this embodiment, nine types of the shogi pieces are identification target objects. The shogi board is a background object. In FIG. 14, a name of each of the pieces is abbreviated as one character. For example, "P" in FIG. 14 means "Pawn" among the shogi pieces and "K" means "King" among the shogi pieces. In this embodiment, the identification module 312 has learned about the shogi board and the nine types of the shogi pieces.

The display control device 40 detects, based on a distance image captured by the first imaging device 10, a touch of a user on any piece on the imaging target object and identifies a type of the touched piece. The display control device 40 controls the display device 50 to display, over the imaging target object, an image indicating squares to which the piece touched by the user is movable. As in the first and second embodiments, the distance image captured by the first imaging device 10 is also used for determination of validity of an identification result of a type of an object based on a luminance image.

As it is evident if FIG. 13 and FIG. 1 are compared, a hardware configuration of the display control device 40 is the same as the hardware configuration of the identification device 30A. That is, the display control device 40 includes the communication device 300, the storage device 310, and the processing device 320. The first imaging device 10, the second imaging device 20, and the display device 50 are connected to the communication device 300. The communication device 300 receives distance image data output from the first imaging device 10. The communication device 300 receives luminance image data output from the second imaging device 20. The communication device 300 outputs image data representing an image to be projected onto the identification target object to the display device 50.

In the storage device 310 of the display control device 40, a program 311C, the identification module 312, and a table 313 are stored. The table 313 and the program 311C, which are differences from the first embodiment, are explained below.

Figure 15:
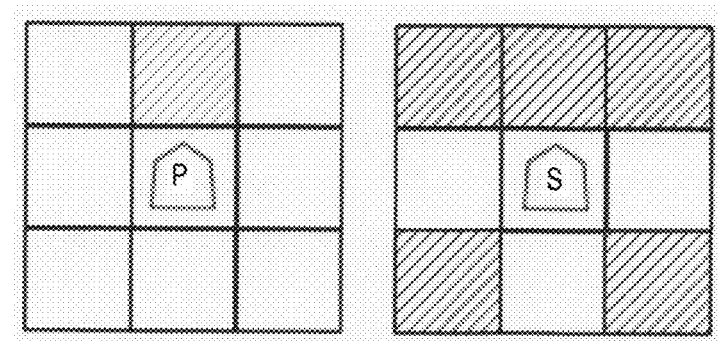
FIG. 15 is a diagram showing an example of squares to which shogi pieces, which are identification target objects, are movable in the embodiment.

In the table 313, for each of the types of the shogi pieces, data indicating squares to which the shogi piece is movable is stored. For example, in the table 313, about "P", as shown in FIG. 15, data indicating one square in the front is stored and, about "S", data indicating one square in each of the oblique right front, the front, the oblique left front, the oblique right rear, and the oblique left rear is stored. In FIG. 15, squares to which each of "P" and "S" is movable are indicated by hatching.

The processing device 320 of the display control device 40 operates according to the program 311C to thereby function as the first acquiring section 321, the second acquiring section 322, the identifying section 323A, a calculating section 324C, the determining section 325A, a detecting section 326, and a display control section 327. That is, the first acquiring section 321, the second acquiring section 322, the identifying section 323A, the calculating section 324C, the determining section 325A, the detecting section 326, and the display control section 327 are software modules realized by causing the processing device 320 to operate according to the program 311C. The calculating section 324C, the detecting section 326, and the display control section 327, which are differences from the first embodiment, are mainly explained below.

The detecting section 326 detects a touch of a fingertip of the user on the imaging target object based on distance image data acquired by the first acquiring section 321. More specifically, the detecting section 326 calculates, about each of pixels forming a distance image represented by the distance image data, a difference ΔD between a reference distance stored beforehand and a distance represented by a present pixel value. The reference distance is a distance represented by a pixel value in a distance image obtained by imaging the imaging target object alone. When there is a pixel, the difference ΔD of which is larger and is smaller than a predetermined threshold, the detecting section 326 determines that a touch of the user is performed and detects the position of the pixel as a touch position. In this embodiment, the threshold is 1 cm.

Like the calculating section 324A in the first embodiment, the calculating section 324C calculates, based on the distance image represented by the distance image data acquired by the first acquiring section 321, an indicator value indicating a reliability degree of an identification result by the identifying section 323A. More specifically, the calculating section 324C divides the distance image represented by the distance image data into 9×9 sub-distance images according to the squares of the shogi board, which is the background object. In this embodiment, N=9 and M=9. The 9×9 sub-distance images correspond to the 9×9 squares of the shogi board in a one-to-one relation. The calculating section 324C calculates an indicator value C indicated by Expression (2) below about each of the 9×9 sub-distance images. In Expression (2), Gt is a total number of pixels forming the calculation target image and Ge is the number of pixels, fluctuation amounts of pixel values of which from a reference image exceed a predetermined threshold, among the pixels forming the calculation target image. That is, only a calculation formula for an indicator value is different between the calculating section 324C and the calculating section 324A.

$$C = 1 - \frac{Ge}{Gt} \qquad (2)$$

Similarly, the identifying section 323A divides a luminance image into 9×9 sub-luminance images corresponding to the 9×9 squares of the shogi board in a one-to-one relation and identifies a type of an identification target object for each of the sub-luminance images.

When an identification result about a sub-luminance image corresponding to the touch position detected by the detecting section 326 is determined as valid by the determining section 325A, the display control section 327 specifies, referring to the table 313, squares to which a piece corresponding to the touch position is movable. The display control section 327 gives image data indicating the specified squares to the display device 50 and causes the display device 50 to display an image indicated by the image data over the imaging target object.

Figure 16:
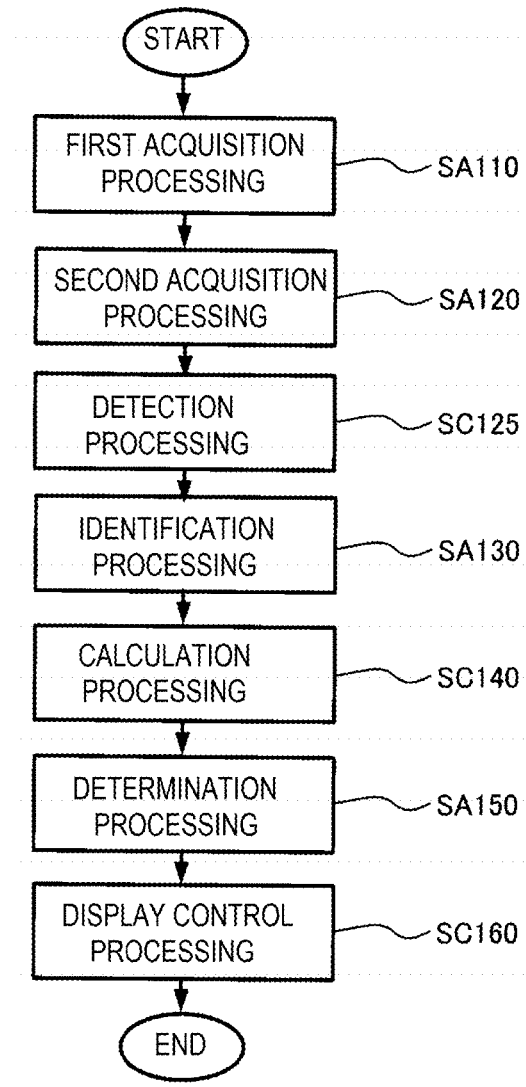
FIG. 16 is a flowchart showing a flow of an identification method in the embodiment.

The processing device 320 of the display control device 40 executes an image display method in the third embodiment of the present disclosure according to the program 311C. FIG. 16 is a flowchart showing a flow of the image display method. As shown in FIG. 16, the image display method includes the first acquisition processing SA110, the second acquisition processing SA120, detection processing SC125, the identification processing SA130, calculation processing SC140, the determination processing SA150, and display control processing SC160.

In the first acquisition processing SA110, the processing device 320 of the display control device 40 functions as the first acquiring section 321. In the first acquisition processing SA110, the processing device 320 acquires distance image data received by the communication device 300. In the second acquisition processing SA120 following the first acquisition processing SA110, the processing device 320 of the display control device 40 functions as the second acquiring section 322. In the second acquisition processing SA120, the processing device 320 acquires luminance image data received by the communication device 300.

In the detection processing SC125, the processing device 320 of the display control device 40 functions as the detecting section 326. In the detection processing SC125, the processing device 320 of the display control device 40 detects a touch position of the user on the identification target object based on a distance image indicated by the distance image data acquired by the first acquiring section 321. In the following explanation, for example, a user who uses "K", that is, "King" arranged in the first row, fifth column in FIG. 14 touches "P" in the third row, seventh column in order to move the "P".

Figure 17:
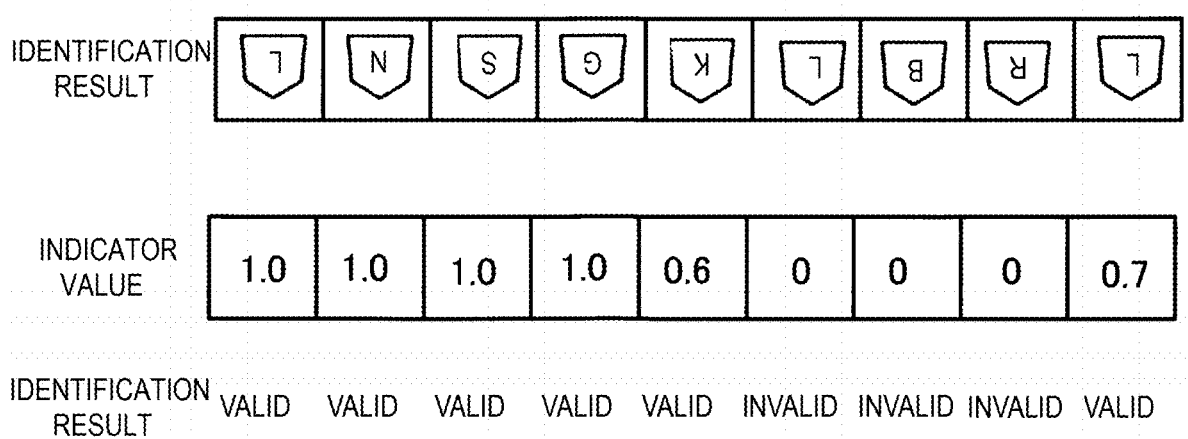
FIG. 17 is a diagram for explaining an operation in the embodiment.

In the identification processing SA130, the processing device 320 of the display control device 40 functions as the identifying section 323A. In the identification processing SA130, the processing device 320 of the display control device 40 identifies a type of an identification target object based on each of the 9×9 sub-luminance images. In FIG. 17, an identification result based on each of nine sub-luminance images corresponding to the first row of the shogi board is shown. In an example shown in FIG. 17, an identification result about the first row, sixth column is "L", that is, "Lance". However, as shown in FIG. 14, an actually arranged piece is "G", that is, "Gold General". In the example shown in FIG. 17, an identification result about the first row, seventh column is "B", that is, "Bishop". However, as shown in FIG. 14, an actually arranged piece is "S". In the example shown in FIG. 17, an identification result about the first row, eighth column is "R", that is, "Rook". However, as shown in FIG. 14, an actually arranged piece is "N", that is, "Knight". That is, in the example shown in FIG. 17, the identification results based on the sub-luminance images in the first row, sixth column, the first row, seventh column, and the first row, eighth column are wrong. This is because, when touching "P" in the third row, seventh column, an arm of the user crosses over the first row, sixth column, the first row, seventh column, and the first row, eighth column of the shogi board and the identification of the identification target objects is performed based on a luminance image captured in a state in which the arm of the user overlaps the identification target objects.

In the calculation processing SC140 following the identification processing SA130, the processing device 320 of the display control device 40 functions as the calculating section 324C. In the calculation processing SC140, the processing device 320 of the display control device 40 calculates an indicator value based on each of the 9×9 sub-distance images. In FIG. 17, an indicator value calculated based on each of the nine sub-distance images corresponding to the first row of the shogi board is shown. In the example shown in FIG. 17, indicator values in the first row, sixth column, the first row, seventh column, and the first row, eighth column are 0 because, in these sub-distance images, fluctuation in pixel values from a reference image is large about all the pixels because of the influence of the imaging in the overlap state of the arm of the user.

In the determination processing SA150 following the calculation processing SA140, the processing device 320 of the display control device 40 functions as the determining section 325A. In the determination processing SA150, the processing device 320 of the display control device 40 determines, about each of the 9×9 sub-luminance images, whether an indicator value calculated based on the sub-distance image corresponding to the sub-luminance image is smaller than a threshold and, when the indicator value is smaller than the threshold, invalidates the identification result of the identification processing SA130. In FIG. 17, a determination result about each of the nine sub-luminance images corresponding to the first row of the shogi board is shown. As explained above, since the threshold is 0.5, in the example shown in FIG. 17, an identification result about the first row, firth column to the first row, fifth column and the first row, ninth column is validated and an identification result about the first row, sixth column to the first row, eighth column is invalidated. In the following explanation, an identification result is invalidated about three sub-luminance images in the first row, sixth column to the first row, eighth column among the 9×9 sub-luminance images but an identification result based on each of the other seventh-eight sub-luminance images is validated. When an identification result based on a sub-luminance image corresponding to a touch position is invalid, an identification result validated in a frame period in the past only has to be used.

Figure 18:
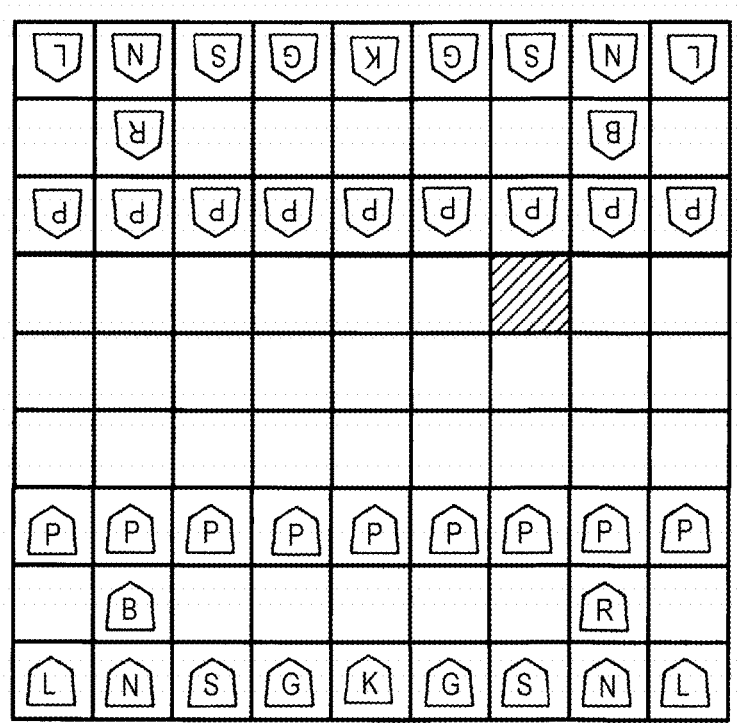
FIG. 18 is a diagram showing an effect in the embodiment.

In the display control processing SC160, the processing device 320 of the display control device 40 functions as the display control section 327. In the display control processing SC160, the processing device 320 causes the display device 50 to display an image corresponding to the identification result determined as valid in the determination processing SA150. In this embodiment, a square in the third row, seventh column is detected as a touch position of the user in the detection processing SC125. Since a piece arranged in the square is "P", an immediately preceding square, that is, a square in the fourth row, seventh column is specified as a square to which the piece is movable. In this embodiment, since the identification result about the square in the third row, seventh column is validated, the processing device 320 causes the display device 50 to display, over the imaging target object, an image for painting out the square in the fourth row, seventh column in a predetermined color. As a result, an image shown in FIG. 18 is imaged on the eyes of the user. In an example shown in FIG. 18, a color indicating a square to which a piece touched by the user is movable is indicated by hatching.

According to this embodiment as well, a reliability degree of an identification result of an identification target object based on a luminance image can be grasped from a distance image different from the luminance image. In this embodiment, an identification result in which an indicator value indicating the reliability degree of the identification result of the identification target object based on the luminance image is smaller than a threshold is invalidated. Therefore, even when a type of a piece corresponding to a touch position is erroneously identified, it is possible to prevent a square to which the piece is movable from being erroneously displayed based on a wrong identification result.

4. Modifications

The embodiments may be changed as explained below.

(1) In the first, second, and third embodiments, the second acquisition processing SA120 is executed following the first acquisition processing SA110. However, the execution order of the first acquisition processing SA110 and the second acquisition processing SA120 may be changed. The execution order of the identification processing SA130 and the calculation processing SA140 in the first embodiment may be changed. The aspect of executing the calculation processing SA140 prior to the identification processing SA130 may be changed to execute the identification processing SA130 only about a sub-luminance image in which the indicator value calculated in the calculation processing SA140 is equal to or larger than a predetermined threshold. Similarly, the image display method in the third embodiment may be changed to execute the calculation processing SC140 prior to the identification processing SA130. When the calculation processing SC140 is executed prior to the identification processing SA130, the image display method may be changed to execute the identification processing SA130 only about the sub-luminance image in which the indicator value calculated in the calculation processing SC140 is equal to or larger than the predetermined threshold.

Similarly, the execution order of the identification processing SB130 and the calculation processing SB140 in the second embodiment may be changed. When the calculation processing SB140 is executed prior to the identification processing SB130, a region of interest only has to be specified based on a distance image. Specifically, edge detection only has to be applied to a luminance image to set a detected edge as a contour line of the region of interest. The edge means a pixel, a pixel value of which suddenly changes when pixel values are sampled in a horizontal scanning direction or a vertical scanning direction of an image. Usually, pixel values are different in a pixel corresponding to an identification target object and a pixel corresponding to a background object in a distance image of an imaging target object. That is, usually, a contour line of the identification target object is the edge in the distance image of the imaging target object. Accordingly, by detecting the edge from the distance image of the imaging target object, the contour line of the identification target object imaged in the distance image can be detected. A region surrounded by the contour line is the region of interest. The aspect of executing the calculation processing SB140 prior to the identification processing SB130 may be changed to execute the identification processing SB130 only about the sub-luminance image in which the indicator value calculated in the calculation processing SB140 is equal to or larger than the predetermined threshold.

(2) The identification device 30A, the identification device 30B, and the display control device 40 are the personal computers but may be smartphones or tablet terminals. The statistical value in the first and third embodiments is the dispersion but may be a standard deviation or may be an average, a maximum, a minimum, a median, a mode, or a quartile. Not the statistical amount of the pixel value of each of the pixels forming the calculation target image but an arithmetic value obtained by convoluting the pixel value of each of the pixels using a convolution kernel may be set as the indicator value. The identification module 312 is not limited to the convolutional neural network and only has to be a discriminator configured by a non-rule-based method for forming identification parameters from a large amount of data such as machine learning performed using image feature values. The display device 50 in the third embodiment is the projector but may be a liquid crystal display that displays, over an image of an imaging target object, an image corresponding to a type of an identification target object included in the imaging target object. When the display device 50 is the liquid crystal display, the display device 50 can be used like AR for superimposing, on a luminance image of the imaging target object, contents corresponding to a position and a type of the identification target object imaged in the luminance image.

(3) In the embodiments, the distance image and the luminance image are respectively captured by the different cameras. However, instead of the first imaging device 10 and the second imaging device 20, one camera including both of an imaging function for the distance image and an imaging function for the luminance image may be used. When the one camera including both of the imaging function for the distance image and the imaging function for the luminance image is used, the second position is the same position as the first position.

(4) The first acquiring section 321, the second acquiring section 322, the identifying section 323A, the calculating section 324A, and the determining section 325A in the first embodiment are the software modules. However, apart or all of the first acquiring section 321, the second acquiring section 322, the identifying section 323A, the calculating section 324A, and the determining section 325A may be hardware. Examples of the hardware include a DSP (Digital Signal Processor), an ASIC (Application Specific Integrated Circuit), a PLD (Programmable Logic Device), and an FPGA (Field Programmable Gate Array). Even if a part or all of the first acquiring section 321, the second acquiring section 322, the identifying section 323A, the calculating section 324A, and the determining section 325A are hardware, the same effects as the effects in the first embodiment are achieved. Similarly, a part or all of the identifying section 323B, the calculating section 324B, and the determining section 325B in the second embodiment may be hardware. Similarly, a part or all of the calculating section 324C, the detecting section 326, and the display control section 327 in the third embodiment may be hardware.

(5) The determining section 325A and the determination processing SA150 in the first embodiment and the third embodiment and the determining section 325B and the determination processing SB150 in the second embodiment are not essential and can be omitted. This is because it is also possible to cause the user to grasp the reliability degree of the identification result by causing the display device to display the indicator value calculated for each of the sub-luminance images by the calculating section 324A or the indicator value calculated for each of the regions of interest by the calculating section 324B. Similarly, the detecting section 326 and the detection processing SC125 in the third embodiment can also be omitted. This is because a method of instructing the display control device 40 about a piece for which display of a square to which the piece is movable is desired is not limited to the touch on the piece and may be an aspect of inputting, to the input device, numerical values indicating a row number and a column number of a square in which the piece is arranged.

(6) In the first embodiment, the program 311A has been stored in the storage device 310. However, the program 311A may be manufactured or distributed alone. As a specific distribution method for the program. 311A, an aspect of writing the program 311A in a computer-readable recording medium such as a flash ROM (Read Only Memory) and distributing the program 311A or an aspect of distributing the program 311A by downloading the program 311A through an electric communication line such as the Internet is conceivable. The same applies to the program 311B in the second embodiment and the program 311C in the third embodiment.

5. Aspects Grasped from at Least One of the Embodiments and the Modifications The present disclosure is not limited to the embodiments and the modifications explained above and can be realized in various aspects without departing from the gist of the present disclosure. For example, the present disclosure can also be realized by aspects described below. Technical features in the embodiments corresponding to technical features in the aspects described below can be substituted or combined as appropriate in order to solve apart or all of the problems of the present disclosure or attain a part or all of the effects of the present disclosure. Unless the technical features are explained in this specification as essential technical features, the technical features can be deleted as appropriate.

In order to solve the problems described above, an aspect of the identification method according to the present disclosure includes the first acquisition processing SA110, the second acquisition processing SA 120, the identification processing SA130, and the calculation processing SA140. In the first acquisition processing SA110, a first image obtained by imaging, with the first imaging device 10 set in a first position, an imaging target object in which the identification target objects A1, A2, and C1, which are identification target objects, are arranged on the background object B1 such as a desk, that is, an imaging target object including the identification target objects A1, A2, and C1 is acquired. The first imaging device 10 is a distance camera. The first image is a distance image. A pixel value of each of pixels in the first image represents the distance from the first position to the imaging target object. In the second acquisition processing SA120, a second image obtained by imaging the imaging target object with the second imaging device 20 set in the first position or a second position different from the first position is acquired. The second image is a luminance image. A pixel value of each of pixels in the second image represents at least luminance of reflected light from the imaging target object. In the identification processing SA130, a type of an identification target object is identified based on the second image. In the calculation processing SA140, an indicator value indicating a reliability degree of an identification result based on the second image is calculated based on the first image. According to this aspect, the reliability degree of the identification result of the identification target object based on the luminance image can be grasped from a distance image different from the luminance image. The identification processing SB130 may be provided instead of the identification processing SA130. The calculation processing SB140 can be provided instead of the calculation processing SA140. According to this aspect as well, the reliability of the identification result of the identification target object based on the luminance image can be grasped from the distance image different from the luminance image.

In an identification method in a more preferred aspect, the calculation processing SA140 may be executed following the identification processing SA130. That is, the type of the identification target object may be identified based on the second image and, thereafter, the indicator value may be calculated based on the first image. An identification method in a still more preferred aspect may include the determination processing SA150 for determining whether the calculated indicator value is smaller than a threshold and, when the calculated indicator value is smaller than the threshold, invalidating an identification result based on the second image.

In an identification method in a still more preferred aspect, a region of interest occupied by an image of the identification target object in the second image may be identified based on the first image or the second image. In this aspect, the type of the identification target object is identified based on an image of the region of interest. An indicator value is calculated based on an image of a region corresponding to the region of interest in the first image.

In an identification method according to another preferred aspect, the first image is divided into a first sub-image and a second sub-image. The second image is divided into a third sub-image corresponding to the first sub-image and a fourth sub-image corresponding to the second sub-image. In this aspect, identification of an identification target object is attempted about each of the third sub-image and the fourth sub-image. An indicator value is calculated based on each of the first sub-image and the second sub-image. When the indicator value calculated based on the first sub-image is smaller than a threshold, an identification result based on the third sub-image is invalidated. Similarly, when the indicator value calculated based on the second sub-image is smaller than the threshold, an identification result based on the fourth sub-image is invalidated.

In an identification method according to a preferred aspect, the first image is divided into a first sub-image and a second sub-image. The second image is divided into a third sub-image corresponding to the first sub-image and a fourth sub-image corresponding to the second sub-image. In this aspect, first, an indicator value is calculated based on each of the first sub-image and the second sub-image. When the indicator value calculated based on the first sub-image is equal to or larger than a threshold, a type of an identification target object is identified based on the third sub-image. When the indicator value calculated based on the second sub-image is equal to or larger than the threshold, a type of an identification target object is identified based on the fourth sub-image.

In an identification method according to a still more preferred aspect, the indicator value based on the first sub-image is a statistical amount of a pixel value of each of pixels forming the first sub-image. Similarly, the indicator value based on the second sub-image is a statistical amount of a pixel value of each of pixels forming the second sub-image.

In the identification processing SA130 or the identification processing SB130, a type of an identification target object may be identified using a discriminator that has learned, in advance, learning data associating images of objects and labels indicating types of the objects and outputs a label indicating a type of an object imaged in an input image.

In order to solve the problems described above, an aspect of the image display method according to the present disclosure includes the first acquisition processing SA110, the second acquisition processing SA120, the identification processing SA130, the calculation processing SC140, the determination processing SA150, and the display control processing SC160. In the display control processing SC160, a third image corresponding to an identification result of a type of an identification target object is displayed over an imaging target object.

In order to solve the problems described above, an aspect of the identification system according to the present disclosure includes the first imaging device 10 set in a first position, the second imaging device 20 set in the first position or a second position different from the first position, and the processing device 320. The processing device 320 executes the first acquisition processing SA110, the second acquisition processing SA120, the identification processing SA130, and the calculation processing SA140. According to this aspect as well, a reliability degree of an identification result of an identification target object based on a luminance image can be grasped from a distance image different from the luminance image. The same effects can be also obtained if the identification processing SA130 is replaced with the identification processing SB130 and the calculation processing SA140 is replaced with the calculation processing SB140.

In order to solve the problems described above, an aspect of the image display system according to the present disclosure includes the first imaging device 10 set in a first position, the second imaging device 20 set in the first position or a second position different from the first position, the display device 50, which is an example of a display device, and the processing device 320. The processing device 320 executes the first acquisition processing SA110, the second acquisition processing SA120, the identification processing SA130, the calculation processing SA140, and the display control processing SC160. According to this aspect, a reliability degree of an identification result of an identification target object based on a luminance image can be grasped from a distance image different from the luminance image. A third image corresponding to the identification result of the identification target object can be displayed over an imaging target object.

In order to solve the problems described above, an aspect of the program according to the present disclosure causes the processing device 320, which is an example of a computer, to execute the first acquisition processing SA110, the second acquisition processing SA120, the identification processing SA130, the calculation processing SA140. According to this aspect as well, a reliability degree of an identification result of an identification target object based on a luminance image can be grasped from a distance image different from the luminance image. The same effects can also be obtained if the identification processing SA130 is replaced with the identification processing SB130 and the calculation processing SA140 is replaced with the calculation processing SB140. Another aspect of the program according to the present disclosure causes the processing device 320, which is an example of a computer, to execute the first acquisition processing SA110, the second acquisition processing SA120, the identification processing SA130, the calculation processing SA140, and the display control processing SC160. According to this aspect, a reliability degree of an identification result of an identification target object based on a luminance image can be grasped from a distance image different from the luminance image. A third image corresponding to the identification result of the identification target object can be displayed over an imaging target object.

What is claimed is:

1. An identification method comprising:
    acquiring a first image, a pixel value of each of pixels of which represents a distance from a first position to an imaging target object including an identification target object;
    acquiring a second image captured from the first position or a second position different the first position, a pixel value of each of pixels of the second image representing at least luminance of reflected light from the imaging target object;
    identifying a type of the identification target object based on the second image; and
    calculating, based on the first image, an indicator value indicating a reliability degree of an identification result of the type of the identification target object based on the second image.

2. The identification method according to claim 1, further comprising:
    calculating the indicator value based on the first image after identifying the type of the identification target object based on the second image; and
    invalidating the identification result based on the second image when the indicator value obtained by the calculating is smaller than a threshold.

3. The identification method according to claim 2, further comprising:
    identifying, based on the first image or the second image, a first region occupied by an image of the identification target object in the second image;
    identifying the type of the identification target object based on an image of the first region; and
    calculating the indicator value based on an image of a second region corresponding to the first region in the first image.

4. The identification method according to claim 2, further comprising:
    dividing the first image into a first sub-image and a second sub-image;
    dividing the second image into a third sub-image corresponding to the first sub-image and a fourth sub-image corresponding to the second sub-image;
    identifying the type of the identification target object about each of the third sub-image and the fourth sub-image;
    invalidating an identification result based on the third sub-image when the indicator value calculated based on the first sub-image is smaller than the threshold; and
    invalidating an identification result based on the fourth sub-image when the indicator value calculated based on the second sub-image is smaller than the threshold.

5. The identification method according to claim 1, further comprising:
    dividing the first image into a first sub-image and a second sub-image;
    dividing the second image into a third sub-image corresponding to the first sub-image and a fourth sub-image corresponding to the second sub-image;
    identifying the type of the identification target object based on the third sub-image when the indicator value calculated based on the first sub-image is equal to or larger than a threshold; and identifying the type of the identification target object based on the fourth sub-image when the indicator value calculated based on the second sub-image is equal to or larger than the threshold.

6. The identification method according to claim 4, wherein the indicator value calculated based on the first sub-image is a statistical amount of a pixel value of each of pixels forming the first sub-image, and the indicator value calculated based on the second sub-image is a statistical amount of a pixel value of each of pixels forming the second sub-image.

7. The identification method according to claim 1, further comprising identifying the type of the identification target object using a discriminator that learned learning data associating images of objects and labels indicating types of the objects and outputs a label indicating a type of an object imaged in an input image.

8. An identification system comprising:
a first imaging device set in a first position and configured to capture a first image, a pixel value of each of pixels of which represents a distance from a first position to an imaging target object including an identification target object;
a second imaging device set in the first position or a second position different from the first position and configured to capture a second image, a pixel value of each of pixels of which represents at least luminance of reflected light from the imaging target object; and
at least one processor executes:
acquiring the first image from the first imaging device;
acquiring the second image from the second imaging device;
identifying a type of the identification target object based on the second image; and
calculating, based on the first image, an indicator value indicating a reliability degree of an identification result of the type of the identification target object based on the second image.

9. A non-transitory computer-readable storage medium storing a program, the program causing a computer to execute:
acquiring a first image, a pixel value of each of pixels of which represents a distance from a first position to an imaging target object including an identification target object;
acquiring a second image captured from the first position or a second position different the first position, a pixel value of each of pixels of the second image representing at least luminance of reflected light from the imaging target object;
identifying a type of the identification target object based on the second image; and
calculating, based on the first image, an indicator value indicating a reliability degree of an identification result of the type of the identification target object based on the second image.

* * * * *